Sept. 8, 1925.

M. PERES

PLANT PROTECTOR

Filed Sept. 27, 1923

1,552,445

Inventor
Marcello Peres,

By Bernard F. Garvey
Attorney

Patented Sept. 8, 1925.

1,552,445

UNITED STATES PATENT OFFICE.

MARCELLO PERES, OF SONORA, TEXAS.

PLANT PROTECTOR.

Application filed September 27, 1923. Serial No. 665,083.

To all whom it may concern:

Be it known that I, MARCELLO PERES, a citizen of the United States, residing at Sonora, in the county of Sutton and State of Texas, have invented certain new and useful Improvements in Plant Protectors, of which the following is a specification.

The present invention relates to plant protectors and has for an object the provision of means which isolates a plant from vermin and animals and also shields the plant from injurious elements such as hail.

Another object of the invention is to provide a protector which may be engaged with one or more plants and will not interfere with the growth of the latter; the protectors are so constructed that they may be conveniently and effectively anchored in the ground, adjacent the plant, by means associated with the protector for that purpose.

A coordinate object of the invention is to provide a plant protector which permits the plants to be reached by the rain, sun and air and is equipped with means serving in the dual capacity of anchors for the protector and means for holding a cover or lid on the latter.

Further objects of the invention will be apparent from the following description of the present preferred form of the invention taken in connection with the accompanying drawings wherein:—

Figure 1:
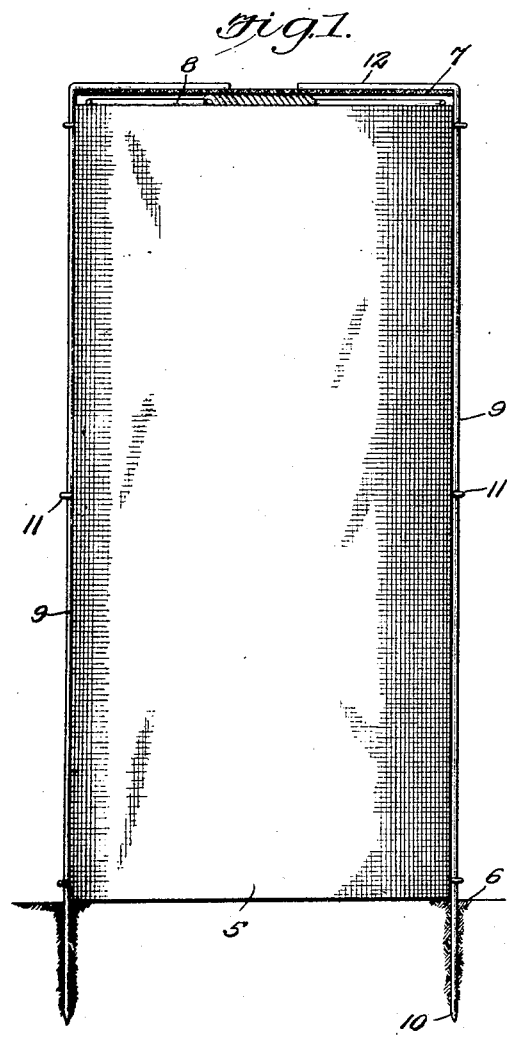
Fig. 1 is a side elevational view of a plant protector constructed in accordance with this invention.

The plant protector consists essentially of a cylindrical perforate body 5 which is formed preferably from a sheet of wire mesh the marginal edges of which may be secured in any desired manner. One end of the body is adapted to be mounted on the ground 6 so as to encircle one or more plants which are to be protected from vermin, animals, or injurious elements such as hail. The bodies will be of a length in excess of the normal growth of the plant or plants with which this device is associated and receives a cover 7 which is likewise preferably of perforate construction. The cover is adapted to be superimposed on the top of the body and in the present instance is shown to be of rectangular configuration. By making the cover of rectangular shape, the margins thereof will extend beyond the periphery of the plant protector body so as to capacitate as a shed for injurious elements such as hail, and minimize the possibility of hail coming in direct contact with the body.

It has been found that during certain seasons of the year, especially in the South, severe storms are encountered, the driving force of which sometimes distorts the top of the protectors. In order to counteract this injurious effect I provide a reinforcing frame 8 which may be interposed between the cover 7 and the upper end of the protector body 5. The frame in the present instance consists of a pair of wires intermediately connected together and having the terminals thereof diverged so as to lie beneath and support the corners of the cover member 7.

In order to anchor the body 5 in the ground, suitable stay rods 9 are provided each of which in the present instance has one end 10 thereof pointed to facilitate penetration of the same in the ground 6. The rods 9 may be of any desired number, but it has been found that two rods mounted at diametrically opposite points on the body will be sufficient to retain the body in a predetermined position. These rods are slidably mounted in eyelets 11 carried by the body and have the upper ends 12 thereof bent inwardly at right angles so as to impinge the cover 7 and hold the latter from displacement. These rods therefore serve in the dual capacity of means for anchoring the plant protector body on the ground as well as means for holding the cover of the body from displacement.

Figure 4:
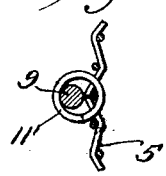
Fig. 4 is a plan view of a modified form of clip employed for holding the stay wire to the body of the protector.

Instead of using permanent eyelets such as those shown at 11 in Fig. 1, detachable eyelets or rings 11' may be provided which capacitate in the same manner as the eyelets 11. The eyelets 11' are each formed from a strand of metal which is convoluted and engaged in the mesh of the body 5. These rings may also be used for joining the marginal edges of the wire mesh body together as shown in Fig. 4.

In using this device the body 5 is mounted on the earth around the plant following which the frame 8 is superimposed on the body and the cover 7 then superimposed on the frame. After this the lower ends of the rods may be penetrated into the earth and the right angled upper ends 12 thereof urged into engagement with the top of the cover 7.

Figure 2:
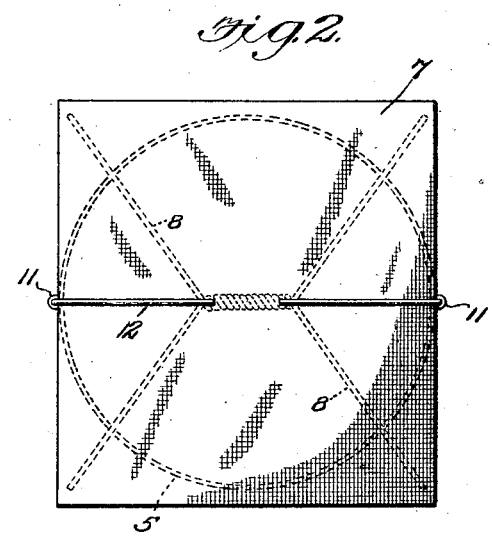
Fig. 2 is a top plan view of the same.
Figure 3:
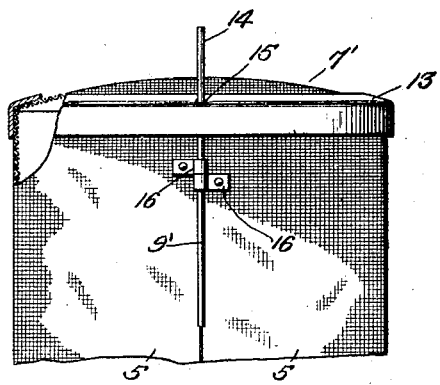
Fig. 3 is a fragmentary elevational view of a slightly modified form of protector.

In Fig. 3 a modified form of cover is provided as indicated at 7'. This cover is of substantially semi-spherical shape and is equipped with a marginal band 13 which extends downwardly at right angles from the cover so as to embrace the upper outer periphery of the body 5 of the protector. In this form of the invention it is preferred to use stay rods 9', of construction similar to the stay rods 9 shown in the form of invention illustrated in Figs. 1 and 2 except that the upper ends of the rods project upwardly in a vertical plane, as indicated at 14, and are engaged through complemental openings 15 formed in the cover band 13. The openings 15 are formed inwardly on the band slightly beyond the upper ends 14 of the stay rods so that it is necessary to flex said upper ends 14 inwardly in order to cause the latter to project through the openings. Also, in this form of the invention, instead of using the eyelets 11, it may be preferred to use loop straps 16 secured to the wire mesh body 5 in proximity to the adjacent margins of the latter. When the stay rods 9' are engaged therethrough the body is held in a cylindrical configuration without the need of other securing means.

From the above it is apparent that the device may be conveniently and effectively anchored in the ground to house one or more plants and will not only protect the plants from vermin and animals, etc., but will also be unaffected by wind or rain storms.

It is of course to be understood that various changes may be made in this device especially in the details of construction, proportion and arrangement of parts within the scope of the claims hereto appended.

What is claimed is:—

1. A plant protector including a perforate body engageable over a plant and equipped with a separate cover out of contact with said body, and rods carried by said body for anchoring the latter, the upper ends of said rods impinging against the top of the cover upwardly therethrough and fastened to said cover.

2. A plant protector including a perforate body equipped with a perforate cover, and means interposed between said body and cover to prevent the latter from being distorted by the pressure of elements thereon.

In testimony whereof I affix my name.

MARCELLO PERES